(12) United States Patent
Govindaraj et al.

(10) Patent No.: US 6,606,665 B2
(45) Date of Patent: *Aug. 12, 2003

(54) MULTIPLE CONNECTION ARCHITECTURE FOR COMMUNICATION WITH A COMPUTER NUMERICAL CONTROL RESIDENT IN A WORKSTATION AND OTHER NETWORKED COMPUTER NUMERICAL CONTROLS

(75) Inventors: Subbian Govindaraj, South Euclid, OH (US); James L. Martin, Mentor, OH (US); Ganesh Rajagopalan, Parma, OH (US); James M. Slagter, Lyndhurst, OH (US)

(73) Assignee: Rockwell Automation Technologies, Inc., Mayfield Heights, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/406,657

(22) Filed: Sep. 27, 1999

(65) Prior Publication Data

US 2003/0046436 A1 Mar. 6, 2003

(51) Int. Cl.⁷ .............................................. G06F 15/16
(52) U.S. Cl. ..................... 709/230; 709/220; 709/246; 709/250; 700/180; 710/104; 710/105
(58) Field of Search ................................. 709/220, 225, 709/227–228, 230, 246, 250; 700/180–181; 710/104–105

(56) References Cited

U.S. PATENT DOCUMENTS

| | | | |
|---|---|---|---|
| 4,418,381 A | | 11/1983 | Molusis et al. ................ 700/2 |
| 5,617,528 A | | 4/1997 | Stechmann et al. ......... 707/517 |
| 5,652,866 A | | 7/1997 | Aldred et al. ................. 703/23 |
| 5,691,897 A | | 11/1997 | Brown et al. ................. 700/56 |
| 5,706,434 A | * | 1/1998 | Kremen et al. ............. 709/230 |
| 5,737,523 A | | 4/1998 | Callaghan et al. .......... 713/201 |
| 5,764,155 A | | 6/1998 | Kertesz et al. .............. 700/295 |
| 5,822,207 A | | 10/1998 | Hazama et al. .............. 700/97 |
| 5,828,575 A | | 10/1998 | Sakai ........................ 700/182 |
| 5,852,441 A | | 12/1998 | Nakajima et al. ........... 709/107 |
| 6,101,425 A | * | 8/2000 | Govindaraj et al. ........ 700/181 |
| 6,131,125 A | * | 10/2000 | Rostoker et al. ............ 709/250 |
| 6,144,895 A | * | 11/2000 | Govindaraj et al. ........ 700/181 |
| 6,311,222 B1 | * | 10/2001 | Crump et al. ............... 709/230 |

OTHER PUBLICATIONS

Walter Stanislowski, "Instrument Control Enhancements Using Microsoft Windows 3.0", IEEE 1992, pp. 239–242.
Dorin Carstoiu et al., "Netware Dynamic Data Exchange", IEEE 1994, pp. 284–287.
Barcellos et al., "A Novel Waveform Analyzer For Analog and Digital Signals For The Windows® Environment" [No Date].

* cited by examiner

*Primary Examiner*—Bharat Barot
(74) *Attorney, Agent, or Firm*—Robert A. Van Someren; Alexander M. Gerasimow; William R. Walbrun

(57) ABSTRACT

A workstation utilized in machine control. The workstation comprises a computer having an open control interface and a computer numerical control resident on the workstation. Communications between the computer and the computer numerical control are converted into an acceptable protocol for the receiving entity and communicated through a PCI connection. The workstation also is configured for connection to a network for communication with other networked devices.

25 Claims, 6 Drawing Sheets

MULTIPLE CONNECTION ARCHITECTURE FOR COMMUNICATION WITH A COMPUTER NUMERICAL CONTROL RESIDENT IN A WORKSTATION AND OTHER NETWORKED COMPUTER NUMERICAL CONTROLS

FIELD OF THE INVENTION

The present invention relates generally to a computer numerical control (CNC) resident on a computerized workstation, such as a personal computer, and particularly to a system utilizing an open control interface that can be used to communicate with the resident CNC as well as a plurality of networked CNCs and other networked devices.

BACKGROUND OF THE INVENTION

A variety of controls are used to monitor and control various types of machine motion. For example, processor-based controls, such as computer numerical controls or CNCs, are used to control the motion of machines, such as machine tools, that are used in a variety of manufacturing environments. A CNC, for instance, may be used to control the movements of a cutter on a machine tool when machining a part or component for use in the manufacture of a given product.

CNC-type controllers have become very popular due, in part, to their adaptability and relative ease-of-use in controlling machine motion. When machining a part, for example, a machine motion control program, e.g., part program, simply can be loaded into the CNC which then causes the machine to move according to the commands established by the part program. The control is designed to read the part program instructions and provide appropriate outputs to the various servos, stepper motors, etc. that physically move the components of the machine.

The CNC also may be used to monitor multiple items related to motion control. For example, in a closed loop system, a variety of sensors are disposed on the machine to provide outputs to the CNC indicative of various parameters, such as position and speed. The CNC compares the sensed parameters with the programmed parameters to detect and correct for any error between the values. As is understood by those of ordinary skill in the art, CNC-type controllers are able to process a wide variety of data related to controlling machine motion, monitoring machine motion, storing and manipulating part program data, etc.

Traditionally, CNCs have been configured in various ways depending on the CNC design established by the CNC manufacturer and/or end user. For example, CNCs typically have included a visual interface, such as a CRT, and a keyboard that allow machine control programs to be entered or edited directly at the CNC. In some systems, machine control programs can be prepared off site at a workstation, such as a personal computer, that is configured to permit an operator to prepare motion control programs in language syntax that is recognizable and useable by the CNC. The program is then loaded onto a storage medium, such as a punch tape, magnetic tape or diskette, and physically taken to the CNC where it is downloaded for use by the CNC in controlling machine motion. For some applications, the program may be transferred electronically from the personal computer to the CNC for execution. In any of these situations, the motion control program must be prepared in a format recognizable and useable by the CNC.

Simultaneously with the development of CNC-type machine controllers, personal computers and computer networks have evolved. Computer networks are now available to permit linking of multiple personal computers and other devices across a single network. For example, local area networks (LANs), such as an Ethernet network, can be used to connect multiple personal computers and data servers with each other and with other devices, e.g., printers and various instruments. The common network allows data to be transferred between the various devices linked to the network.

To permit the networked personal computers and other devices to communicate, it is necessary that the devices have compatible application programming interfaces (APIs) to permit data exchange. In the personal computer area, some common API choices are "C" application programming interfaces (CAPI), Dynamic Data Exchange (DDE™) and object linking and embedding (OLE) automation. Each of these choices has its own advantages and disadvantages depending on the PC operating systems, requirements for support on multiple operating systems, and technologies involved.

For example, the DDE data exchange mechanism has become very popular for use between Windows™ operating system based applications. When using personal computers having Windows based operating systems, such as WindowsNT™ and Windows95™, the DDE data exchange mechanism may be the mechanism of choice.

With respect to both stand-alone personal computers and networked personal computers, the trend has been toward utilization of Windows-based applications. Consequently, a large percentage of personal computers presently have operating systems that utilize Windows-based applications. In many manufacturing and other machine control environments, it would be advantageous to network one or more CNCs with one or more PC-based workstations using a Windows™ operating system. Applications, Ser. Nos. 08/979,128, now U.S. Pat. No. 6,144,895, 08/979,985 now U.S. Pat. No. 6,101,425, and 08/994,517, now U.S. Pat. No. 6,470,377, filed on Nov. 26, 1997, Nov. 26, 1997 and Dec. 19, 1997, respectively, disclose system for providing process-to-process communication between networked CNCs and workstations comprising a personal computer and are incorporated herein by reference. These systems provide great flexibility in the development and use of machine control programs.

It would be advantageous, however, to have such networking capabilities with a workstation that includes both the personal computer processor and the CNC, resident on the same station. Integrating the personal computer and the CNC into a single unit would provide seamless connectivity.

Previously, attempts were made to utilize a personal computer CPU for control of machines, such as machine tools, but the architecture of the typical personal computer had limited ability to control multiple axes and lower processing speeds. Thus, in conventional systems, the personal computer and the CNC have been packaged as separate units.

The present invention addresses the various drawbacks and disadvantages discussed above.

SUMMARY OF THE INVENTION

The present invention relates to an open control interface system utilizing a computer having a central processing unit. The computer is used to facilitate accessing large varieties of CNC data and to provide commands to a CNC that is either resident with the computer or networked. The system includes a personal computer having an operating system that is a workstation-based operating system and on which an application may be run. The system also includes a protocol conversion module, and a CNC resident on the personal computer. The protocol conversion module to selectively communicate with either the CNC resident on the personal computer or a networked CNC, further wherein the protocol conversion module interacts with the application to convert data received from the application into a format suitable for use by either the resident or the networked CNC. The protocol conversion module also converts data received from the resident or the networked CNC into a format appropriate for the application resident on the personal computer. Furthermore, the system may utilize a file handler designed to support multiple CNCs, both resident and networked.

According to another aspect of the invention, a CNC system is provided that may be coupled to a machine to control machine motion. The system includes a computer having a processor and an open control interface resident on a workstation. The workstation also includes a computer numerical control having at least one processor. The computer numerical control is resident on the workstation. The system also includes a networked computer numerical control. Data is entered via the open control interface and is converted into a computer numerical control format such that an operator can read and write data and execute commands, i.e. monitor or control, the resident computer numerical control and/or the networked computer numerical control through the open control interface.

According to another aspect of the invention, a method is provided for utilizing an open control interface with a computer numerical control to increase the versatility of the computer numerical control. The method includes providing a computer workstation with an open control interface through which a computer processor may be utilized. The method further includes combining a computer numerical control with the computer workstation. The method also provides converting data, entered via the open control interface, into a format recognizable by the computer numerical control. Additionally, the method includes connecting the computer workstation to a network to permit communications between the open control interface and other networked devices, including but not limited to other networked CNCs.

BRIEF DESCRIPTION OF THE DRAWINGS

The invention will hereafter be described with reference to the accompanying drawings, wherein like reference numerals denote like elements, and:

FIG. 2A is a schematic representation of a computer numerical control mounted on a PC card;

DETAILED DESCRIPTION OF THE PREFERRED EMBODIMENTS

The present invention provides a system that expands the convenience, adaptability and use of computer numerical controls (CNCs) in a wide variety of manufacturing and production environments. Specifically, the present invention facilitates the combination of a computer, such as a personal computer, and a computer numerical control at a single workstation. The system allows communication between the personal computer and the CNC while permitting the coupling of the workstation to a network for communication with other networked devices, including computers and CNCs. Commands, instructions and other data can be interchanged between the workstation and the other devices, including other CNCs.

Figure 1:
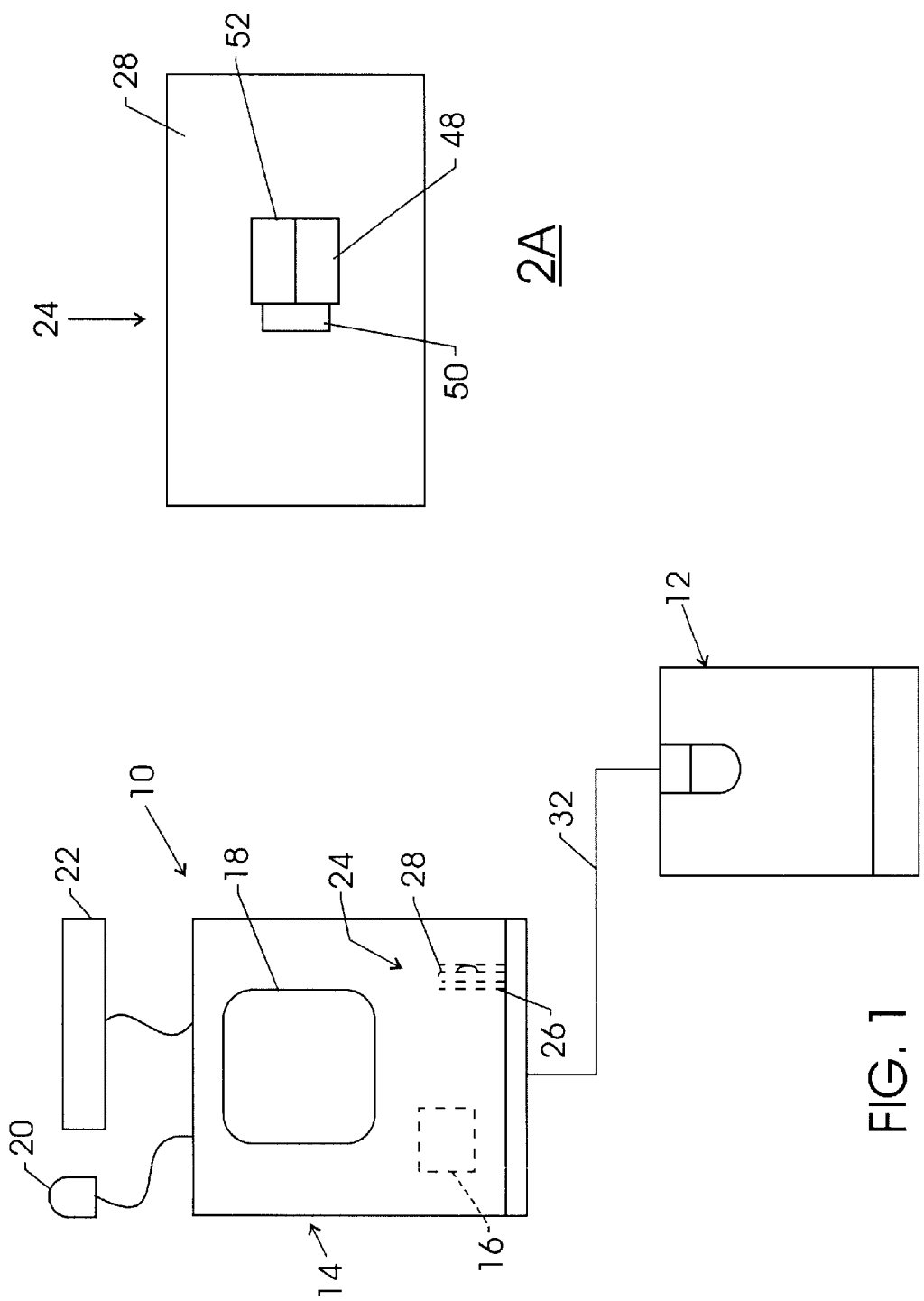
FIG. 1 is a schematic view of a workstation having a resident personal computer and computer numerical control, according to a preferred embodiment of the present invention.

Referring generally to FIG. 1, a workstation 10 is illustrated in communication with a machine 12, such as a machine tool. Workstation 10 preferably comprises a personal computer 14 that may be of a variety of standard configurations. An exemplary personal computer 14, however, includes a central processing unit (CPU) 16 configured with a PENTIUM™ or later generation processor rated at 75 MHz or higher. The exemplary PC also has at least twenty megabytes of RAM and at least thirty megabytes of available hard disk space. The exemplary PC further includes either a VGA or SVGA monitor 18, a mouse 20 and a keyboard 22 for entering data.

Furthermore, workstation 10 comprises a common operating system, such as a Windows-based operating system or a UNIX operating system. Preferably, workstation 10 comprises a Windows-based operating system and includes a Windows-based software package, such as WindowsNT.

Workstation 10 also includes at least one computer numerical control (CNC) 24. CNC 24 is resident on workstation 10, and specifically it is resident on personal computer 14. Workstation 10 is designed to permit communication between personal computer 14 and the resident CNC 24 via a common operating system, such as the Windows-based operating based system discussed above. This permits the input and viewing of machine control parameters through a familiar application program interface. Effectively, there exists a seamless connectivity between the personal computer with its conventional operating system and the CNC. Additionally, CNC 24 can be utilized in controlling machine 12, while other common applications are run on personal computer 14.

In the preferred embodiment, communications between personal computer 14, e.g. CPU 16, and CNC 24 are via a standard PCI slot 26 of personal computer 14. CNC 24 is mounted on a PC card 28 that is inserted into PCI slot 26 for communication with computer 14.

Figure 2:
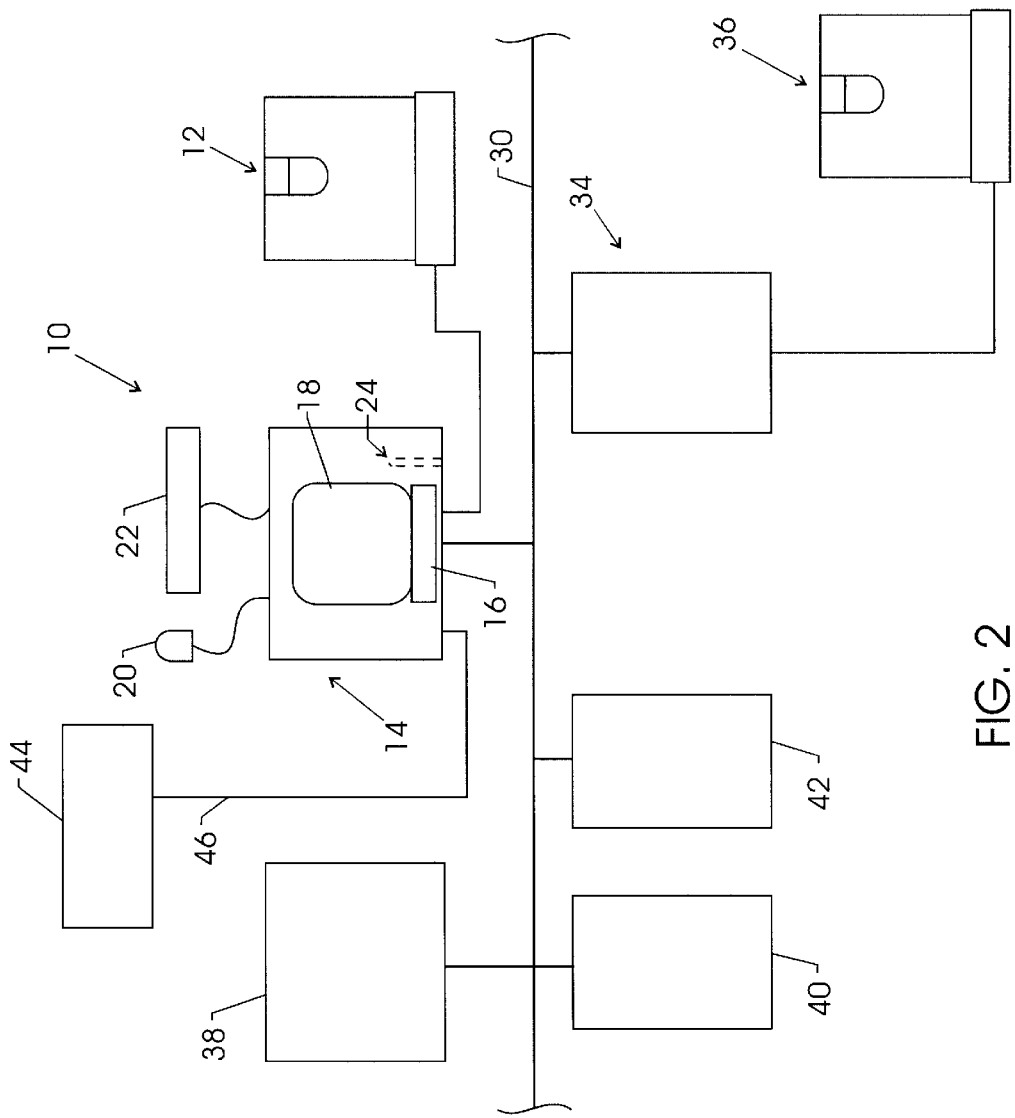
FIG. 2 is a schematic view of the workstation of FIG. 1 networked with other devices, according to a preferred embodiment of the present invention.

As illustrated in FIG. 2, workstation 10 preferably is designed for linking with other devices via a network 30. Workstation 10 utilizes an open control interface and a standard process-to-process communication protocol in a commonly used operating system. However, workstation 10 translates the process-to-process communication protocol to a CNC compatible protocol or vice versa, allowing communication with networked CNCs, such as CNC 34. CNC 34 may be a conventional stand alone CNC or combined with a personal computer into a single workstation, such as workstation 10. Each additional CNC, such as CNC 34, can be used to control one or more additional machines, such as machine 36. It should be noted that workstation 10, and specifically CNC 24, may be coupled to machine 12, by a dedicated control line 32. Also, workstation 10 may control machine 36 via CNC 34 through the network 30.

Use of standard operating systems and process-to-process communication protocols also permits workstation 10 to communicate with other personal computers, such as personal computer 38. Additionally, workstation 10 can communicate with other devices, e.g. devices 40 and 42, such as other CNCs, printers, sensor devices, instruments, etc. for the exchange of data.

In the preferred embodiment, the process-to-process communication protocol is the Dynamic Data Exchange (DDE) communications protocol which permits one DDE-compliant Windows application to communication with other DDE-compliant Windows applications linked to network 30. However, workstation 10 may be adapted to use other application programming interfaces, such as "C" Application Programming Interface (CAPI) or Object Linking and Embedding (OLE) automation, that also can be adapted to accomplish desired process-to-process communication. Because of their different protocols, CNCs traditionally have not been amendable for communication with such application programming interfaces that utilize, for example, Windows-based applications. Thus, the adaptability and flexibility of Windows-based operating systems have not been sufficiently available in CNC environments.

Furthermore, network 30 may comprise a variety of network types, e.g., WANs or LANS, but in most applications it is a local area network (LAN). For example, network 30 preferably is an Ethernet TCP/IP network that is readily useable for the linking of multiple personal computers, CNCs and other devices, applications and workstations.

Also, a remote computer 44 may be coupled to workstation 10 by a serial line 46. Remote computer 44 can be used both for control and monitoring of CNC 24 in cooperation with workstation 10. For example, an operator interface can be utilized at computer 44 to control CNC 24. Also, computer 44 can be used in cooperation with workstation 10 to perform software upgrades, failure assessment, diagnostics, etc. Effectively, personal computer 14 is utilized as a server for remote computer 44. Preferably, the open control interface utilized by workstation 10 is DHCP compatible to facilitate connection of remote computer 44 via network 30 for such upgrades, failure assessment and diagnostic procedures to be performed on CNC 24. The open architecture and the networkability of the various devices provides users with great system flexibility. Potentially, numerous workstations, such as workstation 10, computer 38 or computer 44 can be used to monitor and/or control either CNC 24 or CNC 34.

Referring to FIG. 2A, the preferred CNC 24 includes one or more processors 48 that cooperate with a CNC executive 50 to receive data from personal computer 14, or a networked computer, and to communicate data back to personal computer 14 or the networked computer. The CNC executive 50, along with processor 48, also executes commands, e.g. part program commands, and monitors the motion and other parameters of a machine under its control. Part programs and other data can be loaded into a CNC memory 52. An exemplary CNC 24 is a 9/PC CNC available from Allen-Bradley Company, L.L.C., located at 1201 South Second Street, Milwaukee Wis. However, CNC 24 potentially can be selected from a variety of types or brands of computer numerical controls that may be mounted on a PC card for combination with personal computer 14 via PCI slot 26.

In a typical environment requiring motion control, CNC 24 is connected to machine 12, such as a machine tool that can be used to perform a variety of operations, including milling, drilling, boring and grinding. However, CNC 24 can be used to control a variety of other types of machines and processes, including coordinate measuring and part manipulation. In any of these situations, CNC 24 can be adapted to provide the necessary control of machine motion to carry out a desired process, as is understood by those of ordinary skill in the art. Workstation 10 provides an operator with the convenience, flexibility, adaptability and multiple uses of a Windows-based operating system in reading and writing data, as well as providing commands to CNC 24 which, in turn, is responsible for controlling the motion of one or more machines, such as machine 12.

Figure 3:
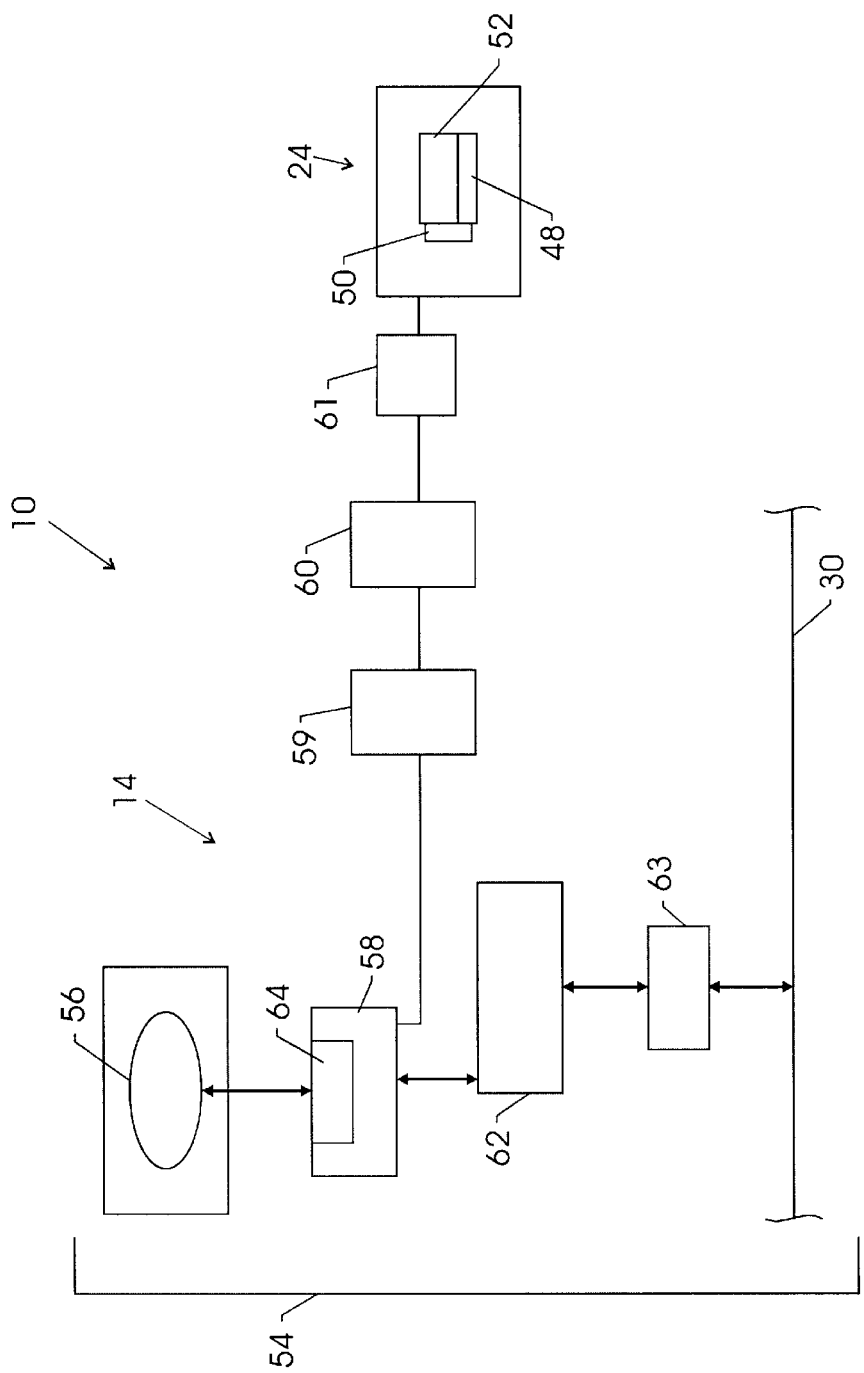
FIG. 3 is an illustration of a portion of an open control interface adapted to communicate with a computer numerical control, according to a preferred embodiment of the present invention.
Figure 4:
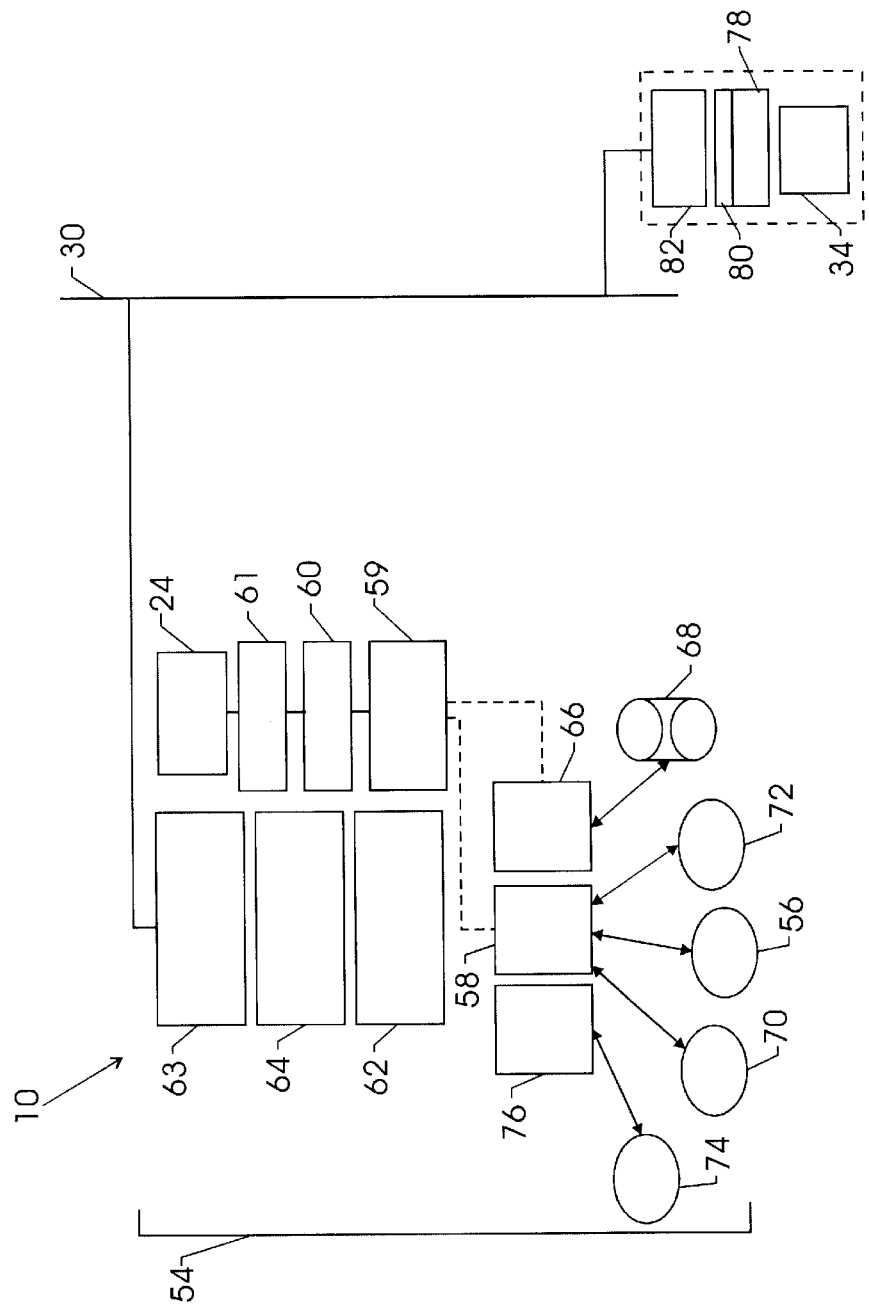
FIG. 4 is an illustration of one preferred open control interface architecture that allows communication between the personal computer and the computer numerical control within the workstation as well as communication over a network.
Figure 5:
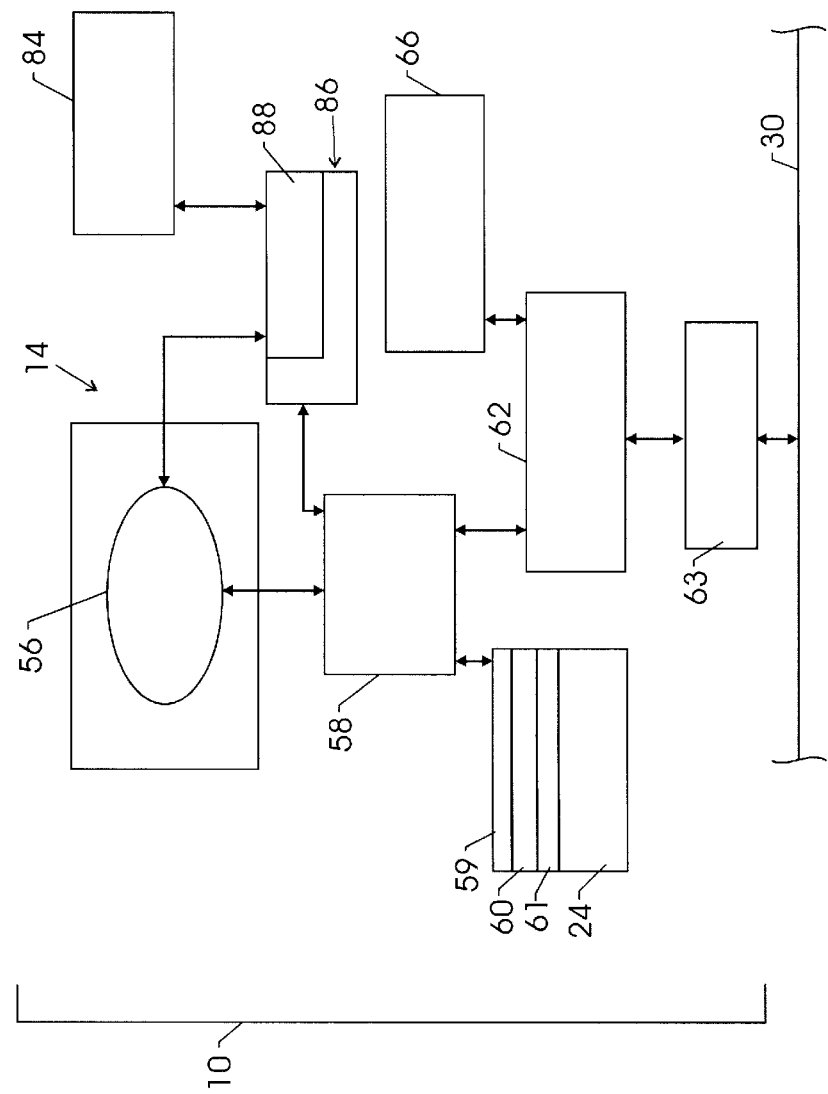
FIG. 5 is an illustration of additional software modules that can be used with the open control interface illustrated in FIG. 3.

Referring generally to FIGS. 3–5, a preferred embodiment of the generally open architecture of workstation 10 will be further described. In this preferred embodiment, it should be assumed that a Windows-based operating system, preferably WindowsNT Version 4.0 or higher, is utilized along with the Dynamic Data Exchange process-to-process communication protocol. Thus, workstation 10 is configured for DDE-compliant Windows applications. However, the present invention should not be construed as limited to this configuration and is adaptable to other versions of Windows and/or UNIX or other workstation-based operator systems, other compatible process-to-process communication protocols and other network types.

The general implementation of a preferred embodiment of workstation 10 is illustrated in FIG. 3. Personal computer 14 uses an open control interface 54 that utilizes a Windows-based operating system. Open control interface 54 typically utilizes a personal computer, such as personal computer 14 described above. In the preferred embodiment, open control interface 54 combines a WindowsNT™ operating system with Dynamic Data Exchange communication protocol so that a variety of DDE-compliant Windows-based applications, e.g. a DDE-compliant Windows application 56, may be used on workstation 10.

The DDE-compliant application 56 communicates with a conversion module 58 which converts DDE protocol communications/data entered at the DDE-compliant Windows application 56 to a CNC-compatible protocol. Additionally, conversion module 58 converts data received from CNC 24 into DDE-compliant data that is passed back to DDE-compliant application 56.

Conversion module 58 communicates with resident CNC 24 via a communications API/DLL (Dynamic Link Library) module 59 coupled to a CNC support service 60 and an appropriate driver 61, such as a 9/PC PCI driver. Module 59, support service 60 and driver 61 permit the transfer of data between conversion module 58 and resident CNC 24 for both the monitoring and control of CNC 24. Depending on the overall design of CNC 24 and open control interface 54, the configuration of modules 59, 60 and 61 may change. However, a preferred exemplary communications module 59, CNC support service module 60 and driver 61 are available as a software installation, 9/PC Software Installation CD catalog number: 8520-LMEX, from Allen-Bradley Company.

In an exemplary embodiment in which the open architecture system utilizes Windows NT, the CNC communications module 59 provides the interface functions that are used by the Windows NT application for transacting CNC communications. An exemplary CNC support service module 60 comprises a user mode Windows NT service that serves as the interface between other user mode applications and the kernel mode device driver that communicates with the CNC. In this same exemplary system, driver 61 is a 9/PC PCI Driver that comprises a Windows NT kernel mode device driver. This driver interfaces from Windows NT to the CNC using the PCI bus for communications. In this embodiment, user mode Windows NT applications use the driver 61 to conduct transactions with the CNC executive running on the 9/PC CNC.

Furthermore, conversion module 58 cooperates with a communication management module 62, preferably a client server, which effectively manages data flow between conversion module 58 and an appropriate network interface 63 so that, when desired, data supplied from conversion module 58 may be encoded for transmission across network 30. For example, the client server 62 may encapsulate validated DDE requests provided to conversion module 58; place them into appropriate parameterized CNC command protocols; and send them over network 30 to the appropriately addressed CNC, such as CNC 34. In this preferred embodiment, network 30 is an Ethernet network and network interface 63 comprises a TCP/IP compatible Ethernet card, such as the Etherlink III™ card distributed by 3Com Corporation. Communication management module 62 handles both data from conversion module 58 that is sent to networked CNCs and data communicated from the networked CNCs to conversion module 58.

In the preferred embodiment, conversion module 58 is a data server. An exemplary data server for use with a CNC, such as the Allen-Bradley 9/Series CNC, is the 9/Series OCI Data Server, Catalog No. 8520-IFP1, that utilizes a software module 64 referred to as the RSServer Tool Kit™ module to facilitate translation to the appropriate DDE or CNC protocol used in this exemplary system. The 9/Series OCI Data Server is available from the Allen-Bradley Company, and the RSServer Tool Kit™ is available under Catalog No. 9355WABOEMM, from Rockwell Software, Inc., a subsidiary of Allen-Bradley Company, L.L.C. and located at 6680 Beta Drive, Cleveland, Ohio. Additionally, in this embodiment, a preferred communication management module 62 also is available from Rockwell Software and is referred to as the RSLinx™ software, Catalog No. 9355WABOEMM.

The combination of conversion module 58, communications module 59, support service 60, driver 61, communication management module 62 and network interface 63 provides for the selective reading and writing of data as well as the communication of commands, entered via DDE-compliant application 56, to either resident CNC 24 or a networked CNC, such as CNC 34. The various modules 58–63 permit workstation 10 to monitor and/or control a resident CNC as well as networked CNCs. Further, other networked devices, such as computer 38, potentially can control and/or monitor resident CNC 24 as well as other networked CNCs.

With respect to networked CNCs, communication data is organized in packets, appropriate for a given network, that are properly addressed and transmitted over network 30 to the desired device, e.g. CNC 34. Thus, the motion of a machine, such as machine 12 or machine 36, may be affected and monitored via standard PC 14 (or other PC) utilizing a conventional Windows-based operating system. This provides a user with great flexibility in the use of workstation 10, not only with the resident CNC 24, but potentially with other Windows-compliant CNCs, devices and applications linked to network 30.

Referring generally to FIG. 4, a more detailed schematic of the software architecture of open control interface 54 is illustrated. The open architecture readily allows selective communications between PC 14 and the resident CNC 24; between PC 14 and networked devices coupled with network 30; and between CNC 24 and other networked devices via network 30.

As previously described, a DDE-compliant Windows application 56 communicates with a conversion module/data server 58 which, in turn, selectively communicates with CNC 24 (via modules 59–61) or with a networked CNC (via communication management module 62). The data server 58 converts DDE protocol communications into an appropriate protocol that is recognizable and useable by resident CNC 24 or a networked CNC, such as CNC 34.

For communications across network 30, communication management module 62 utilizes a communication tool 64, such as the WINSOCK™ communication tool software available from Microsoft Corporation. The communication tool provides for the interchange of data, including commands, with a networked CNC via network interface 63 which, in the preferred embodiment, is a TCP/IP Ethercard having a WINSOCK™-compliant driver (e.g. 3Com Corporation's Ethernet III card).

In addition to the basic software components outlined above, the open control interface 54 preferably includes a file handler 66. File handler 66 cooperates with communication management module 62 and a storage medium, such as a hard disk 68, of personal computer 14. File handler 66 typically is a software module that provides an interface between the hard drive 68 of PC 14 (or another network drive) and the designated CNC, such as resident CNC 24 or networked CNC 34. This configuration allows an operator to use the hard drive 68 as a location for CNC motion control program storage as well as program execution. The file handler 66, in cooperation with communication tool 64 and network interface 63, allows for the intercommunication of data across network 30 between a remote CNC and hard drive 68.

File handler 66 also utilizes communications module 59, support service 60 and driver 61 to communicate with workstation resident CNC module 24. Thus, file handler 66 operates on workstation 10 to provide file handler services to the entire CNC system. File handler services include transferring files to and from CNCs, both resident CNC 24 and networked CNC 34. Additionally, the file handler can be utilized to activate part programs on resident or networked CNCs when the part programs are not located on a CNC. In fact, its programs need not be located on the workstation 10, and they can be located at another network location accessible to workstation 10. The file handler 66 also allows sub program calls to be made from any active part programs, active on resident CNCs 24 or networked CNCs 34, to part programs resident in its own memory, the workstation 10 or networked locations.

The exact design or configuration of file handler 66 depends on the particular type of CNC and CNC protocol utilized. However, a preferred file handler 66, for use with the exemplary resident or networked 9/Series CNC discussed above, is the 9/Series OCI CNC File Handler, Catalog No. 8520-IFP1, available from the Allen-Bradley Company. With the use of this type of file handler, CNC 24 or CNC 34 easily can copy and execute part programs that are located in the personal computer directory. Often, however, the part program is loaded on the CNC. This is more important with a networked CNC to minimize the network traffic and to eliminate the time required for transferring part program data over the network during execution of the program. Loading the part program on the networked CNC is particularly helpful when the program includes very short data blocks used to control certain motions of, for example, machine 36.

The architecture of open control interface 54 facilitates the use of additional CNC applications 70 as well as other third party applications 72 on personal computer 14. The DDE-compliant conversion module 58 allows such Windows-compliant third party applications and CNC applications to be used for the reading and writing of data to CNC 24 via PCI slot 26 or to other CNCs or devices linked to network 30. For communications across network 30, it is important that the data is appropriately addressed for transfer to and from those other devices, including such devices as device 40 and device 42. For example, Windows-compliant spreadsheet applications or graphics applications can be loaded onto PC 14 and used to directly access CNC data from either CNC 24 or a networked CNC with no special modification.

Furthermore, open control interface 54 remains amenable for use with an off-line development system 74, such as the Allen-Bradley Off-line Development System (ODS), Catalog No. 8520-ODS, that allows a user to create, edit, document, and troubleshoot machine configuration, machine interfaces, and machine motion control files. The off-line development system 74 also can be used to upload and download part programs with either CNC 24 or network CNCs, such as CNC 34. When off-line development system 74 is connected over a network, it requires an appropriate driver 76, such as the RSI Virtual Device Driver™, Catalog No. 9355WABOEMM, available from Rockwell Software. Driver 76 cooperates with communication management module 62 to implement communications across network 30.

It should be noted that with a networked CNC, such as CNC 34, the CNC utilizes a communications module 78. Communications module 78 includes an appropriate client server 80 adapted to obtain the necessary protocol parts, such as instructions to read data, write data or execute commands, from the data packets that are received over network 30 from DDE-compliant application 56 and data server 58. The client server 80 presents these instructions/requests to CNC 34 where they are appropriately processed by the CNC processor and CNC executive. Communications module 78 cooperates with a driver 82, such as an Ethernet TCP/IP driver, to send and receive data and commands over, for example, an Ethernet network 30.

The design of communications module 78 and client server 80 depends on the preferred CNCs and protocols implemented in the overall system. However, in the exemplary embodiment, an Ethernet module, such as the OCI Ethernet module, Catalog No. 8520-ETCP, available from the Allen-Bradley Company, may be used as an interface between the 9/Series CNC and an Ethernet TCP/IP compatible network. This type of Ethernet module provides for commands and data transfers to/from systems running a suitable conversion module/data server 58. The Ethernet module also passes through instructions from conversion module 58 to the CNC regarding the transfer of CNC part programs from file handler 66 (the CNC then sends the appropriate request to file handler 66 for the desired part program); facilitates transmission of commands and file transfers from off-line development system 74; and allows updates to be made to the CNC executive.

As illustrated in FIG. 5, certain other features may be combined with the overall system to enhance performance, adaptability and ease-of-use for the operator. For example, different types of Windows-compliant CNC related applications can be used on PC 14 and the open control interface 54. However, a customized display set 84 may be helpful in allowing a user to prepare an operator interface having desired screens displayed on monitor 18 of workstation 10. The screens can be customized, for instance, to emulate screens with which the operator is familiar. For example, the 9/Series Basic Display Set™, available from the Allen-Bradley Company, is a DDE-compliant application that provides the user interface between personal computer 14 and the CNC 24 (e.g. a 9/PC CNC) or 34 (e.g., a 9/Series CNC). This software emulates the 9/Series CNC screens and allows the user to control, program, position and monitor the CNC via an interface that is recognized and comfortable for the operator to use.

Additionally, a performance enhancement software module 86 may be used to provide enhanced performance for systems implementing Rockwell Software's Advance DDE™ protocol. For example, Rockwell Software supplies a software module called RSData™, Catalog No. 9361DATAOCXOEM, that can be used with suitable DDE-compliant applications 56 and conversion module 58 to provide enhanced performance in a system that conforms to the Advance DDE™ protocol. RSData takes advantage of a high speed DDE communications module 88, such as Rockwell Software's RSJunction Box™, Catalog No. 9361JBOXOEM, that facilitates considerably higher performance between appropriate DDE-compliant applications and data servers. The foregoing provides examples of potential modifications to the overall system.

The system described above provides a wide variety of arrangements for workstations, CNCs, controlled machines, and other devices. The combined CNC and personal computer of workstation 10 provides an efficient, unified package that is readily useable by an operator in programming, controlling and monitoring a given machine. The system further facilitates the use of a wide variety of other applications in addition to the specific CNC application. Also, the unique design of the open architecture permits workstation 10 to be incorporated into a networked system having a wide variety of topologies. For example, numerous workstations 10 may be connected to network 30, and any of the personal computers potentially can communicate with any of the CNCs. This provides an extremely variable M-to-N topology. Additionally, stand-alone CNCs, such as CNC 34, and a wide variety of other devices can be coupled to network 30, for potential communication with any of the networked personal computers or CNCs, regardless of whether they are combined in a single workstation 10 or separated as with personal computer 38 and CNC 34.

An additional advantage of the overall network system is its unique ability to preserve both CPU and network bandwidth for communications between remote networked personal computers and CNCs. In conventional network systems, networked devices are continuously polled for data by the workstation, e.g. a stand-alone PC. However, in the present network arrangement, the polling of data is performed internally to the CNC, e.g. CNC 24 or 34. For example, in CNC 24, the polling of data is performed by processor 48, and data is transmitted over network 30 to another location on the network, e.g. personal computer 38, only when necessary or at select, limited times. This preserves not only network bandwidth but also the CPU bandwidth of the subject personal computer by releasing the CPU from handling the polling task and allowing it to communicate with other networked devices or to run other applications. Without the ability to push polling responsibility to a given CNC, such as CNC 24 or CNC 34, certain machining environments or CNC applications might require a dedicated PC.

In other situations, CPU bandwidth of a networked computer preferably is further preserved by pushing other data handling tasks to a remote, networked CNC. Some examples include loading part programs directly into the CNC; utilizing the greater efficiency of advance DDE protocol; and bundling related and/or unrelated pieces of data that are sent over network 30 as "bundled packets". The use of bundled packets reduces the time otherwise spent by the CPU of the personal computer in managing the transfer of numerous smaller pieces of data.

Figure 6:
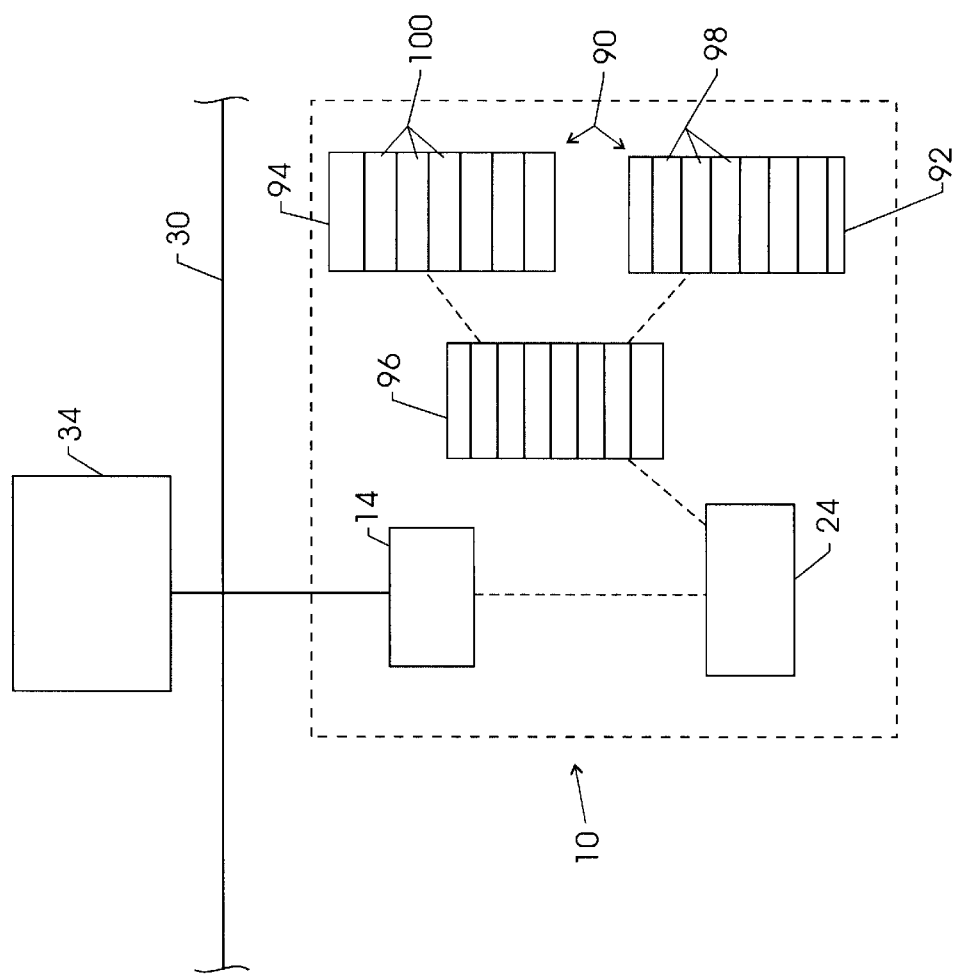
FIG. 6 is a schematic representation of watchlists maintained by a CNC, according to a preferred embodiment of the present invention.

Preferably, a given CNC, such as CNC 24 or CNC 34, maintains at least one watchlist 90 on its own processor, e.g. processor 48. A schematic representation of the utilization of watchlists is illustrated in FIG. 6. The use of a watchlist on the CNC processor maintains a greater bandwidth and improved network performance compared to conventional network arrangements that require continuous network data traffic due to polling from one or more workstations. A processor of a given CNC may be configured to maintain multiple watchlists for multiple applications, e.g. DDE-compliant applications, on multiple personal computers or workstations. In the latter arrangement, the subject CNC sends data to the appropriate "requesting" workstation when a monitored data item on one of the watchlists changes.

In an exemplary embodiment, the CNC maintains a pair of watchlists for a given workstation, such as workstation 10. The pair of watchlists typically includes a foreground watchlist 92 and a background watchlist 94. Depending on the type of data item requested by the controlling conversion module, e.g. conversion module 58, the item is added to the appropriate watchlist. For example, the foreground watchlist may be configured for items that the system designer wishes to poll during each predesignated system scan. Background watchlist items, on the other hand, may be polled only when there is excess time available during a system scan time. Thus, the system may be designed to handle different types of watchlist data items according to different levels of priority by addressing certain data items for the background watchlist 94 and other items for the foreground watchlist 92.

Additionally, both the foreground watchlist and the background watchlist preferably are in communication with a watchlist buffer 96. Watchlist buffer 96 is helpful in managing the transmission of data packets that are sent from foreground watchlist 92 and background watchlist 94 over network 30 to a designated conversion module 58. An exemplary situation is when personal computer 14 is being utilized in controlling and/or monitoring of remote, networked CNC 34.

Data server/conversion module 58 converts the information into a DDE format and forwards it to the DDE-compliant application 56. Typically, foreground watchlist 92 is designed to have capacity for multiple watchlist entries 98, and background watchlist 94 is similarly designed to accommodate multiple watchlist entries 100. As changes occur with respect to a data item in a given watchlist entry, those changes are sent to watchlist buffer 96 which effectively organizes the order of transmitting data packets over network 30 to the appropriate controlling conversion module/data server 56.

It will be understood that the foregoing description is of a preferred exemplary embodiment of this invention and that the invention is not limited to the specific forms shown. For example, the specific workstations can combine personal computer capabilities and CNC capabilities in a variety of arrangements; the specific types of computer processor and CNC can be adjusted according to specific applications, needs or changes in technology; and the combined CNC and personal computer can operate as a stand-alone workstation or as a networked workstation. As is understood by those of ordinary skill in the art, the specific conversion techniques and software module configurations for a networked system depend on the specific protocols used in a given system, e.g. specific Windows-based process-to-process protocol as well as the protocol or protocols recognized and used by a given CNC. Also, there are a variety of ways to address and otherwise format the packets of data communicated between a given Windows-based application and a given CNC. The specific handling of data depends on the type of network used, the operating system version chosen, the need for linking with multiple types of operating systems, the brand or type of CNC and the other technologies incorporated into the system. However, these and other modifications may be made in the design and arrangement of the elements described above without departing from the scope of the invention as expressed in the appended claims.

What is claimed is:

1. A open control interface system utilizing a computer having a central processing unit, to facilitate accessing large varieties of computer numerical control (CNC) data and to provide to a CNC that is either resident or networked, comprising:

a workstation having an operating system that is a workstation-based system and on which an application is executable;

a resident CNC that resides on the workstation; and a protocol module, wherein the protocol conversion module is configured to selectively communicate with either the resident CNC residing op the workstation or a networked CNC, further wherein the protocol conversion module interacts with the application to convert data received from the application into a format suitable for use by either the resident CNC or the networked CNC and to convert data received from either the resident CNC or the networked CNC into a format appropriate for the application resident on the workstation.

2. The open control interface system as recited in claim 1, wherein the workstation-based system is a personal computer, Windows-based system and the application is a Windows compliant application.

3. The open control interface system as recited in claim 2, further comprising an application program interface configured to establish a link for data transfer between the Windows-compliant application and the protocol conversion module.

4. The open control interface system as recited in claim 3, further comprising a network interface cooperating with the protocol conversion module to send data through a network.

5. The open control interface system as recited in claim 4, further comprising the networked CNC located at a remote network location.

6. The open control interface system as recited in claim 4, wherein the network interface comprises an Ethernet driver coupleable to a Ethernet network.

7. The open control interface system as recited in claim 2, wherein the operating system utilizes Dynamic Data Exchange® (DDE) communication protocol to accomplish process-to-process communication of data between the Windows-compliant application and the protocol conversion module.

8. The open control interface system as recited in claim 1, wherein the workstation includes a peripheral component interconnect (PCI) slot and the resident CNC is communicatively coupled with the PCI slot.

9. The open control interface system as recited in claim 1, further comprising a file handler.

10. The open control interface system as recited in claim 9, wherein the file handler is configured to support multiple computer numerical controls, including the resident CNC and the networked CNC.

11. CNC system that may be coupled to a machine to control machine motion, comprising:
   a computer having a processor and an open control interface resident on a workstation;
   a resident computer numerical control having at least one processor, the computer numerical control being resident on the workstation; and
   a networked computer numerical control, wherein the open control interface is usable to electively monitor or control both the resident computer numerical control and the networked computer numerical control.

12. The workstation as recited in claim 11, wherein the open control interface comprises a Windows-based operator interface.

13. The workstation as recited in claim 12, wherein the open control interface comprises a data server that provides an interface permitting the Windows-based operator interface to send and receive data from the resident computer numerical control and the networked computer numerical control.

14. The workstation as recited in claim 13, wherein the open control interface implements as its communication protocol for DDE-compliant Windows applications and the data server provides a DDE interface between the resident computer numerical control and the DDE-compliant Windows applications as well as between the networked computer numerical control and the DDE-compliant Windows applications.

15. The workstation as recited in claim 14, further comprising a network interface to permit communication between the computer and the networked computer numerical control.

16. The workstation as recited in claim 15, wherein the resident computer numerical control is mounted on a PC card.

17. The workstation as recited in claim 16, wherein the workstation includes a PCI card slot for receiving the computer numerical control personal computer (CNC PC) card.

18. The workstation as recited in claim 15, wherein the network interface permits communication with a plurality of networked devices.

19. A method for utilizing an open control interface with a computer numerical control to increase the versatility of the computer numerical control, comprising:
   providing a computer workstation with an open control interface through which a computer processor is accessible;
   combining a computer numerical control with the computer workstation;
   converting data entered via the open control interface into a format recognizable by the computer numerical control; and
   connecting the computer workstation to a network to permit communications between the open control interface and other networked devices.

20. The method as recited in claim 19, wherein providing includes providing a Windows-based operator interface.

21. The method as recited in claim 20, further comprising loading a DDE-compliant application into the computer workstation and configuring a data server to provide the DDE-compliant application access to the data server via a DDE link.

22. The method as recited in claim 21, wherein converting includes converting data supplied to the data server in DDE format to a format recognizable and usable by the computer numerical control.

23. The method as recited in claim 19, wherein combining includes mounting the computer numerical control on a PC card and engaging the PC card with a PCI slot on the computer workstation.

24. The method as recited in claim 23, further comprising utilizing a file handler to support the computer numerical control and the networked computer numerical control.

25. The method as recited in claim 19, further comprising transmitting data between the open control interface and a networked computer numerical control.

* * * * *